HENRY E. POND, OF FRANKLIN, MASSACHUSETTS.

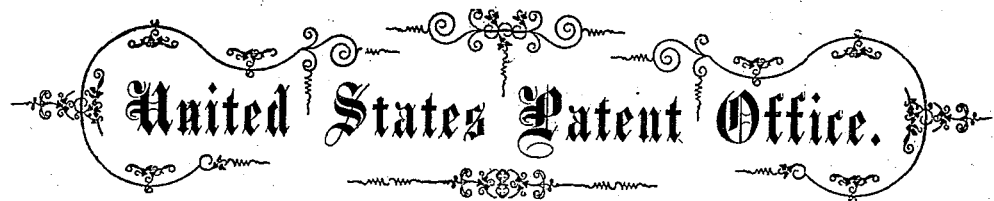

Letters Patent No. 70,608, dated November 5, 1867.

IMPROVED FERTILIZER.

*The Schedule referred to in these Letters Patent and making part of the same.*

TO ALL TO WHOM THESE PRESENTS SHALL COME:

Be it known that I, HENRY E. POND, of Franklin, in the county of Norfolk, and State of Massachusetts, have invented a new and useful artificial fertilizer, which I call "Nitro-Phosphated Fertilizer;" and do hereby declare the following to be a full, clear, and exact description of its ingredients and the process for manufacturing it.

In preparing the above-mentioned fertilizer, I take meadow-muck in the proportion of fifteen hundred to two thousand pounds, and dry it naturally or artificially until about one-half of its moisture has been evaporated, and add to the mass twenty pounds, in the same ratio, of sulphuric acid, and mix the two thoroughly. After standing for about ten hours the mass should again be mixed or stirred, and sulphate of lime or gypsum to the amount of one hundred and fifty pounds in the above proportion incorporated with it. I then take nitrate of potash fifty, salt eighty, nitrate of soda one hundred, in the proportions of fifty, eighty, and one hundred pounds, or thereabouts, and dissolve them in as little boiling water as will answer the purpose, and thoroughly mix this solution with the muck and acid. After standing for five hours, I add and thoroughly mix with the mass one hundred pounds in proportion of superphosphate or biphosphate of lime, and let the whole thoroughly dry, when it may be placed in barrels for transportation. The gypsum, superphosphate of lime, and nitrate of potash, and soda may be added in varying proportions, according to the use required of the fertilizer, or other chemicals may be added or substituted.

My invention consists principally in the use of sulphuric acid as applied to meadow-muck, or its equivalent, and the incorporation of saltpetre and other salts therewith. The acid destroys the germs of sorrel, or other plants and weeds, which would otherwise grow to a great extent. The fertilizer under the formula, substantially as before given, possesses great fertilizing properties, and can be manufactured at a cost very much below that of other artificial fertilizers in use.

I claim as my invention, and desire to secure by Letters Patent—

The new fertilizer, substantially as before described.

HENRY E. POND.

Witnesses:
  E. C. GRIFFITH,
  FREDERICK CURTIS.